US007016649B1

(12) United States Patent
Narasimhan et al.

(10) Patent No.: US 7,016,649 B1
(45) Date of Patent: Mar. 21, 2006

(54) SPACE-TIME AND SPACE-FREQUENCY HOPPING FOR CAPACITY ENHANCEMENT OF MOBILE DATA SYSTEMS

(75) Inventors: Ravi Narasimhan, Los Altos, CA (US); Piu Bill Wong, Monte Sereno, CA (US); Shimon B. Scherzer, Sunnyvale, CA (US); Jiangfeng Wu, Combell, CA (US)

(73) Assignee: Kathrein-Werke KG, Rosenheim (DE)

( * ) Notice: Subject to any disclaimer, the term of this patent is extended or adjusted under 35 U.S.C. 154(b) by 899 days.

(21) Appl. No.: 09/803,718

(22) Filed: Mar. 9, 2001

Related U.S. Application Data

(60) Provisional application No. 60/190,009, filed on Mar. 17, 2000.

(51) Int. Cl.
*H04Q 7/20* (2006.01)
(52) U.S. Cl. ............... 455/63.1; 455/552.1; 455/562.1
(58) Field of Classification Search ............ 455/422.1, 455/443, 562.1, 444, 114.2, 446, 452.1, 452.2, 455/13.3, 67.13, 501, 504, 63.1, 63.2; 370/235, 370/335, 320, 441, 501, 342; 375/130
See application file for complete search history.

(56) References Cited

U.S. PATENT DOCUMENTS

| | | | | |
|---|---|---|---|---|
| 5,838,673 A | * | 11/1998 | Ritz et al. ................ 370/336 |
| 5,890,067 A | * | 3/1999 | Chang et al. ............. 455/446 |
| 5,982,327 A | * | 11/1999 | Vook et al. .............. 342/380 |
| 6,002,947 A | * | 12/1999 | Smith ...................... 455/562.1 |
| 6,072,788 A | * | 6/2000 | Peterson et al. .......... 370/337 |
| 6,229,486 B1 | * | 5/2001 | Krile ....................... 343/700 MS |
| 6,253,063 B1 | * | 6/2001 | Cudak et al. ............. 455/63.1 |
| 6,295,279 B1 | * | 9/2001 | Lin ........................... 370/252 |
| 6,327,297 B1 | * | 12/2001 | Schilling ................. 375/134 |
| 6,330,460 B1 | * | 12/2001 | Wong et al. ............. 455/562.1 |
| 6,370,128 B1 | * | 4/2002 | Raitola ..................... 370/329 |
| 6,389,034 B1 | * | 5/2002 | Guo et al. ................ 370/441 |
| 6,393,030 B1 | * | 5/2002 | Kim et al. ................ 370/441 |
| 6,453,177 B1 | * | 9/2002 | Wong et al. ............. 455/562.1 |
| 6,650,910 B1 | * | 11/2003 | Mazur et al. ............ 455/562.1 |
| 6,704,557 B1 | * | 3/2004 | Krishnamurthy et al. 455/278.1 |
| 6,738,365 B1 | * | 5/2004 | Silventoinen et al. .... 370/336 |
| 6,771,989 B1 | * | 8/2004 | Katz et al. ............... 455/562.1 |

OTHER PUBLICATIONS

U.S. Appl. No. 60/190,009, Space-Time and Space-Frequency Hopping for Capacity Enhancement of Mobile Data Systems, filed Mar. 17, 2001.

(Continued)

*Primary Examiner*—Jean Gelin
(74) *Attorney, Agent, or Firm*—Fulbright & Jaworski LLP

(57) ABSTRACT

The present invention utilizes adaptive antenna arrays at a base station to increase the forward link capacity of mobile data systems. One or more simultaneous forward link beams are formed and are switched (or hopped) in a time division manner among subscribers. The beam hopping sequence is randomized by varying the time slot and/or carrier frequency of each subscriber. In space-time hopping, the position within a frame of the time slot for each subscriber is varied in a pseudo random sequence. In space-frequency hopping, the carrier frequency for each frame is varied in a pseudo random sequence. The pseudo random beam hopping sequence provides a gain due to interference diversity in addition to the antenna array gain. Forward link beam forming algorithms use space-time or space-frequency hopping to increase the capacity of mobile data systems.

60 Claims, 8 Drawing Sheets

OTHER PUBLICATIONS

U.S. Appl. No. 09/511,665, "Transmitting Beam Forming in Smart Antenna Array Systems", filed Feb. 23, 2000.

U.S. Appl. No. 09/229,482, "Practical Space-Time Radio Method for CDMA Communication Capacity Enhancement", filed Jan. 13, 1999.

U.S. Appl. No. 09/310,567, "Manifold Assisted Channel Estimation and Demodulation for CDMA Systems in fast sading environments", filed May 12, 1999.

U.S. Appl. No. 09/450,318, "Polarization and Angular Diversity among Antenna Beams", filed Nov. 29, 1999.

Viterbi, CDMA, "Principles of Spread Spectrum Communications", p. 227 (1995).

Kronestedt and Andersson, "Adaptive Antennas in Frequency Hopping GSM", ICUPU 1998, pp. 325-329.

* cited by examiner

TIME SLOT HOPPING

FREQUENCY HOPPING

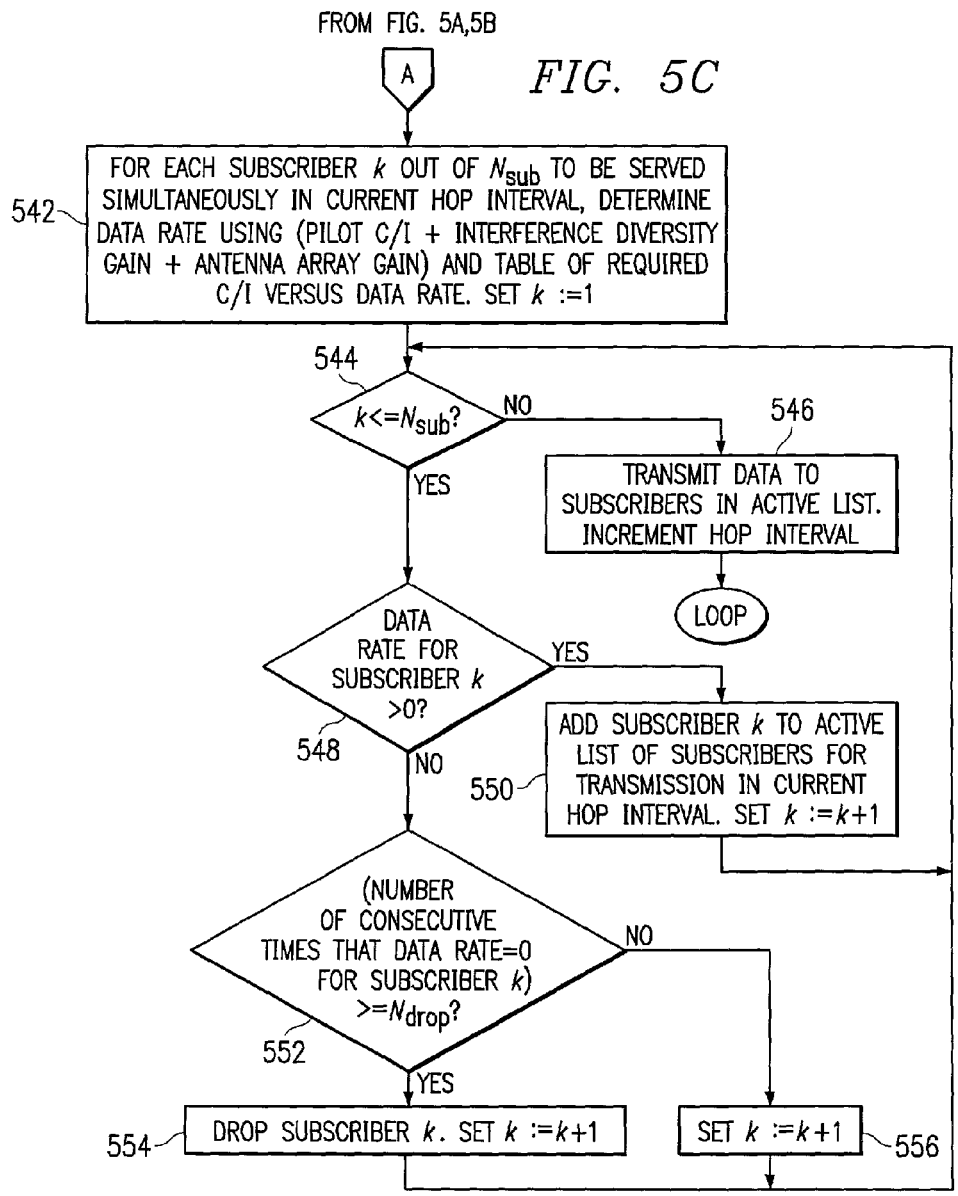

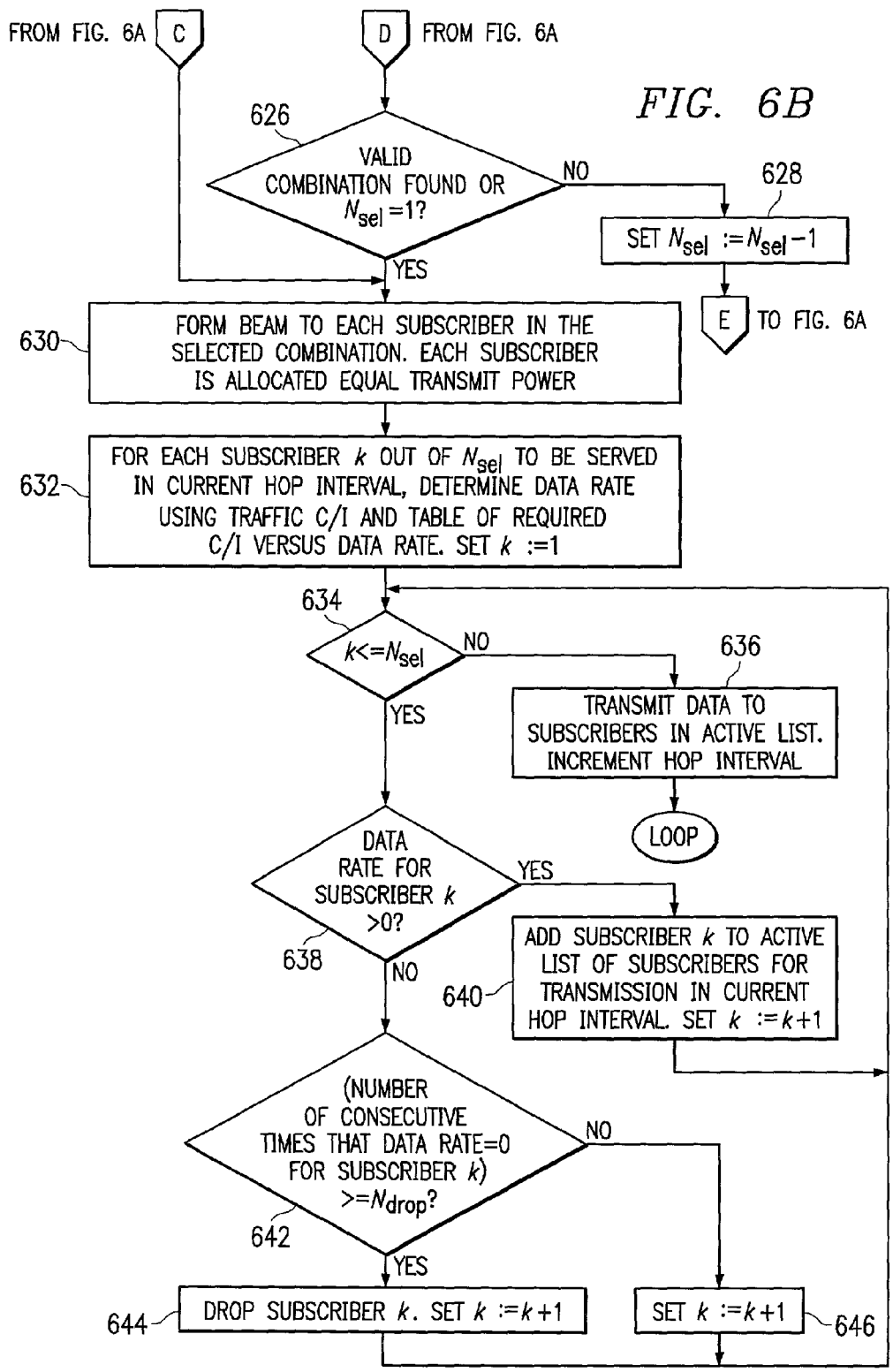

SPACE-TIME AND SPACE-FREQUENCY HOPPING FOR CAPACITY ENHANCEMENT OF MOBILE DATA SYSTEMS

RELATED APPLICATIONS

The present application is related to now abandoned U.S. provisional patent application Ser. No. 60/190,009 entitled "Space-Time and Space-Frequency Hopping for Capacity Enhancement of Mobile Data Systems," filed Mar. 17, 2000, to which the benefit of priority of filing is hereby claimed and the disclosure of which is hereby incorporated herein by reference, and the present application is also related to now abandoned U.S. provisional patent application Ser. No. 60/234,722 entitled "Space-Time Hopping for Capacity Enhancement of Mobile Data Systems," filed Sep. 22, 2000, to which the benefit of priority of filing is hereby claimed.

The present application is also related to co-pending and commonly assigned U.S. patent application Ser. No. 09/229,482, entitled "Practical Space-Time Radio Method for CDMA Communication Capacity Enhancement", filed on Jan. 13, 1999, U.S. patent application Ser. No. 09/511,665 entitled "Transmitting Beam Forming In Smart Antenna Array Systems", filed Feb. 23, 2000, U.S. patent application Ser. No. 09/310,567 entitled "Manifold Assisted Channel Estimation and Demodulation for CDMA Systems in Fast Fading Environments", filed May 12, 1999, and U.S. patent application Ser. No. 09/450,318 entitled "Polarization and Angular Diversity Among Antenna Beams", filed Nov. 29, 1999, the disclosures of which are hereby incorporated herein by reference.

TECHNICAL FIELD

The present invention relates generally to mobile data systems and, in particular, to increasing subscriber capacity through use of time, frequency, and/or space hopping techniques.

BACKGROUND

The wireless telecommunications market has experienced an enormous subscriber growth in recent years, with no signs of slowing. It is therefore becoming more and more essential for wireless network operators to be able to increase capacity (i.e. support more subscribers) with the limited available spectrum of transmission frequencies.

There are currently a number of techniques in use or under development to improve the downlink (base-station-to-mobile subscriber) transmission capacity of wireless networks. The most common technique is to use sectored antennas within cells whereby either separate antennas or separate beams of a phased array antenna system are used to cover different geographic sectors within the cell. Other techniques for increasing network capacity include time division multiple access ("TDMA") and frequency division multiple access ("FDMA") such as used by, for example, the GSM ("Global System for Mobile telecommunications") system predominant in Europe. Code division multiple access ("CDMA") is an increasingly pervasive technique for expanding subscriber capacity.

Most typically, cells are divided into three or six sectors, where each sector covers 120° or 60° degrees respectively. With this approach, the capacity of a cell with three equal-sectored (120°) antennas, for example, is increased due to an increase in the reuse of channels throughout the network and/or improved signal quality associated with the use of directional antennas. For example, in a code division multiple access system, theoretically three times the capacity of that of a cell using an omnidirectional antenna at the base station may be achieved using a three sectored system. Ideally, the capacity could be improved n-fold by employing n 2p/n radian beamwidth antennas or antenna sectors. As a practical matter, this ideal increase is not possible due to the necessity and desirability of some beam overlap (see, Viterbi, *CDMA, Principles of Spread Spectrum Communications*, p. 227 (1995) incorporated herein by reference).

Yet another approach to increased wireless system capacity is the use of multiple beam, or "smart" antennas, such as shown and described in the above referenced patent application entitled "Polarization and Angular Diversity Among Antenna Beams." Systems utilizing smart antenna systems have the ability to form or select relatively narrow beams for transmission depending upon a subscriber's position relative to the base station, rather than transmitting on a single beam encompassing the antenna's entire coverage area. The use of such multiple beam antennas provides for selection of relatively narrow antenna beams for providing communications with respect to a particular mobile unit. Accordingly, the amount of interfering energy experienced in the communicated signals is reduced because power is not wasted by having it transmitted to areas where it cannot be received by the subscriber.

Such smart antenna systems may be used in combination with standard frequency hopping techniques (see, for example, Kronestedt and Andersson, "Adaptive Antennas in Frequency Hopping GSM", ICUPU 1998, pp. 325–29 incorporated herein by reference). Frequency hopping consists of altering the carrier frequency transmitted to a given subscriber between transmission time frames.

However, it should be appreciated that in the previously proposed schemes, the antennas are not truly adaptive. Adaptive antennas can be controlled to transmit relatively narrow, focused beams directed at an individual subscriber, where the beam width is chosen to be as small as possible to provide the desired or necessary power to the subscriber through the use of complex antenna signal weighting. Instead of providing such adaptive antenna configurations, the previously proposed schemes transmit on a series of fixed beams, such as may be associated with a fixed beam forming network, e.g., a Butler matrix.

Accordingly, a need exists in the art for systems and methods which provide increased subscriber capacity in a wireless communication system over that available through the use of currently available techniques, such as sectorization, switched beam smart antenna systems, and frequency hopping.

SUMMARY OF THE INVENTION

The present invention is directed to a system and method in which the use of narrow antenna beams is combined with techniques implemented to pseudo randomize occurrences of interference to reduce or average the effects of such interference and, thereby, provide subscriber capacity increases. Accordingly, embodiments of the present invention may utilize frequency (e.g. carrier frequency) hopping, time (e.g. time slot or burst period) hopping, and/or space (e.g. directional antenna beam) hopping.

Preferably, adaptive beam forming techniques are utilized in providing narrow antenna beams used according to the present invention to minimize radio frequency within the service area. It should be appreciated that the use of a true adaptive antenna, i.e., one capable of dynamic forward beam forming directed to a particular subscriber, is a challenge to implement in a mobile wireless communication system. For example, because of differences in the forward and reverse link channels and/or due to the use of carrier frequencies having different propagation characteristics in the forward and reverse link channels, it is generally difficult to determine signal weighting parameters to form an adaptive antenna beam in one such link channel based upon channel characteristics of the other such link channel. However, systems and methods for determining mobile subscriber unit location and for the formation of adaptive antenna beams have recently been developed, as are shown and described in the above referenced applications entitled "Transmitting Beam Forming In Smart Antenna Array Systems" and "Manifold Assisted Channel Estimation and Demodulation for CDMA Systems in Fast Fading Environments".

A preferred embodiment of the present invention combines the use of true adaptive antennas, to provide highly directional forward link antenna beams, with time slot hopping to improve wireless network capacity. According to this embodiment of the invention, multiple subscriber units may be provided communications during a communication frame or set of frames (e.g. a "super frame"), each in an assigned time slot of the frame, by directing an antenna beam thereto during the respective time slot (referred to herein as space-time hopping). In successive frames the time slot assigned to a particular subscriber unit is changed, i.e., hops, to a different frame time slot. The time slot hops according to the present invention may be sequential, e.g. selecting a next or previous frame time slot, or pseudo random, e.g. selecting a time slot in no apparent order. Through use of different time slots for a subscriber unit's communications, interference associated with the use of any one particular time slot, such as may result from a subscriber unit operating in a neighboring service area using a corresponding time slot, may be avoided or otherwise mitigated.

Preferred embodiments of the present invention may use frequency hopping in combination with time slot hopping in the technique described above. Accordingly, an additional degree of freedom is provided for use in avoiding or otherwise mitigating interference. According to this embodiment of the invention, multiple subscriber units may be provided communications during a communication frame or set of frames (e.g. a "super frame"), each in an assigned time slot of the frame using an assigned carrier frequency, by directing an antenna beam thereto during the respective time slot (referred to herein as space-time-frequency hopping). Preferably, in successive frames the time slot assigned to a particular subscriber unit hops to a different frame time slot and the carrier frequency assigned to a particular subscriber unit is changed, i.e., hops, to a different carrier frequency. As with the time slot hops described above, the frequency hops according to the present invention may be sequential, e.g. selecting a next or previous carrier frequency, or pseudo random, e.g. selecting a carrier frequency in no apparent order.

Space-time, space-frequency and space-time-frequency hopping according to the present invention give rise to a time-varying interference power received by a subscriber. The time-varying interference power provides a diversity gain with respect to a system which may be realized according to the present invention using conventional interleaving, error control coding and adaptive modulation techniques.

It should be appreciated that time slot and frequency hopping according to the present invention need not be carried out according to a same algorithm. For example, time slot hopping may be sequential while frequency hopping is pseudo random. Likewise, time slot hopping may be carried out with one period, such as on a single frame bases, while frequency hopping is carried out with another period, such as on a super frame basis.

There is no limitation that such hopping techniques be utilized throughout communications according to the present invention. For example, a particular hopping technique may be implemented upon the occurrence of a condition, such as when a communication system reaches a particular capacity, when communication quality reaches a particular threshold, or even after one particular hopping technique has been implemented and desired results have not been fully achieved.

According to a preferred embodiment of the present invention multiple antenna beams may be utilized, such as in the forward link, to provide simultaneous communications to a plurality of subscriber units. In situations where sufficient isolation is proved for the communication of signals associated with multiple subscriber units, such as where such units have sufficient spatial separation, the present invention may serve multiple groupings of subscriber units, preferably using the above described time and/or frequency hopping techniques to provide interference diversity gain allowing simultaneous communications, to further increase subscriber capacity. For example, two or more simultaneous forward link beams are formed and redirected during particular time slots to respective subscriber units separated sufficiently in angle. For each transmission frame, the time slot and/or carrier frequency for each subscriber unit is varied such that the beam switching, or hopping, sequence is pseudo random.

Two preferred embodiment algorithms are described herein to provide forward link beam forming according to the present invention. These two preferred embodiment algorithms are a fast hopping algorithm and a slow hopping algorithm.

According to a preferred embodiment fast hopping algorithm, the hopping rate is greater than the interleaving frame rate, preferably on the order of several times the interleaving frame rate. Preferably, using conventional adaptive modulation or adaptation of the processing gain, the data rate available to a subscriber unit is based upon the carrier-to-interference ratio (C/I) of a pilot signal (which illuminates an entire sector), the gain of the antenna array and the interference diversity gain. Diversity gain is estimated from the statistics of the interference environment. Estimates of the diversity gain are adapted slowly as the interference environment changes. Accordingly, although a particular subscriber unit may experience interference sufficient to result in a higher than acceptable error rate, this interference will be experienced for a sufficiently short duration (because of the fast hopping) that the subscriber unit is provided with acceptable communications. For example, where the hopping rate is selected to be sufficiently short, the above described period of an unacceptable error rate may result in loss of a few symbols which may be corrected by forward error correction (FEC) techniques well known in the art.

According to a preferred embodiment slow hopping algorithm, the hopping rate is less than the interleaving frame rate, preferably on the order of a tenth or tenths of the interleaving frame rate. During each hop the active subscribers preferably adapt the data rate according to measured channel characteristics, such as the C/I measured on the traffic channel according to conventional techniques. According to a preferred embodiment, the slow hopping algorithm uses not only pilot C/I measurement, but also an estimated channel quality indicator from a traffic channel.

Preferably, in order to maintain a constant data rate for the duration of each hop, hopping at neighboring base stations is time synchronized in order that the measured channel characteristics remain substantially constant throughout a hop. Slow hopping is applicable for long burst communications where sufficient time is available for measuring the channel characteristics.

A technical advantage is provided in that utilizing hopping techniques of the present invention, systems utilizing communications standards such as Global System for Mobile Communications (GSM), Interim Standard 136 (IS-136), General Packet Radio Service (GPRS), Enhanced Data Rates for GSM Evolution (EDGE), and Qualcomm's High Data Rate (HDR) may be provided increase interference diversity gain and, therefore, increased subscriber capacity and/or improved signal quality. For example, an HDR system may be adapted according to the present invention to include adaptive antennas capable of transmitting simultaneous beams, together with time slot hopping to provide increased interference diversity gain. However, because downlink transmission occupies the entire available downlink bandwidth, it may not be desirable to implement frequency hopping according to the present invention to thereby avoid significant adaptation of the HDR system. A GSM system, on the other hand, may readily be adapted according to the present invention to utilize adaptive antennas, frequency hopping, and time hopping to improve network capacity.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION

Figure 1A:
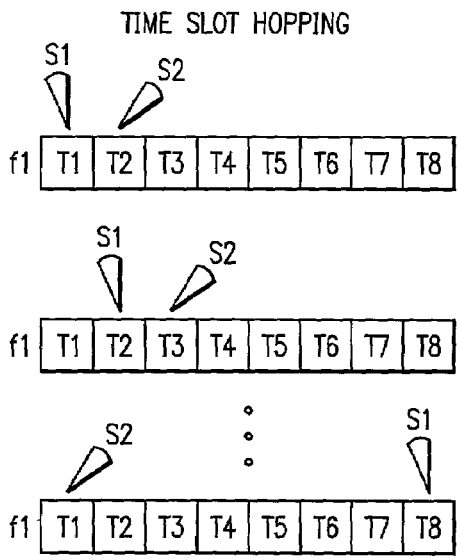
FIG. 1A illustrates the concept of time slot hopping.
Figure 1B:
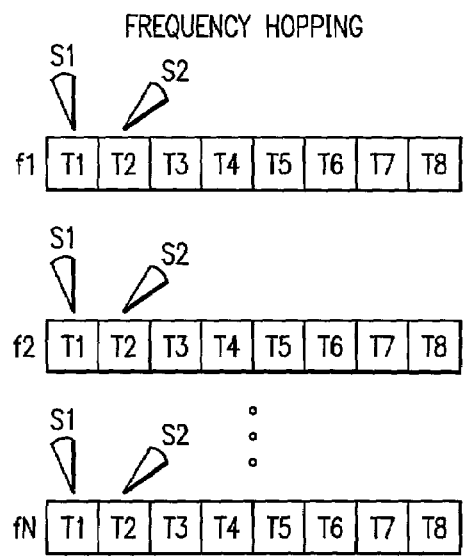
FIG. 1B illustrates the concept of frequency hopping.

FIGS. 1A and 1B illustrate the concepts of frequency hopping and time slot hopping for two subscribers (S1 and S2) using a deterministic hopping sequence. In the examples of FIGS. 1A and 1B, there are eight time slots per frame (T1, T2, . . . , T8), similar to a conventional TDMA scheme. The carrier frequency (f1, f2, . . . , fN) is shown to the left of each frame. Although particular embodiments are illustrated, it should be appreciated that the present invention is not limited to such embodiments. For example, more or less than the illustrated time slots per frame may be utilized. Additionally, hopping may be implemented on a "super frame" bases rather than frame by frame as illustrated. Similarly, there is no requirement that a same carrier frequency be utilized throughout a particular frame.

In the time slot hopping of FIG. 1A, the carrier frequency remains constant while the position within a frame of the time slot for each subscriber (S1 and S2) varies between frames. In the frequency hopping of FIG. 1B, the position within a frame of the time slot for each subscriber (S1 and S2) remains constant while the carrier frequency varies between frames. Although a deterministic hopping sequence is shown in FIGS. 1A and 1B, a pseudo random sequence is preferably chosen in practice.

As further discussed below, either or both technique may be used with narrow directional antenna beams according to the present invention to provide communications with multiple subscriber units having increased interference diversity gain. When combined with the use of narrow antenna beams directed to a particular subscriber unit as described herein ("space hopping"), a generalization of time slot and frequency hopping can be referred to as "space-time-frequency hopping" in which both the time slot and carrier frequency for each subscriber are varied. According to the preferred embodiment, the particular antenna beam used for data transmission will vary between subscribers according to their position relative to the base station. In this way, system capacity can be increased substantially because interference is avoided or otherwise mitigated as data communication for each subscriber unit is conducted during various time slots and/or on various carrier frequencies.

Preferred embodiments of the present invention utilize adaptive array antennas to provide the aforementioned narrow beams adapted for channel conditions associated with the subscriber units. Adaptive array antennas suitable for use according to the present invention are shown and described in the above referenced patent application entitled "Transmitting Beam Forming in Smart Antenna Array Systems". However, alternative embodiments of the present invention may utilize switched narrow beam systems, such as shown and described in the above referenced patent application entitled "Polarization and Angular Diversity Among Antenna Beams".

Figure 2:
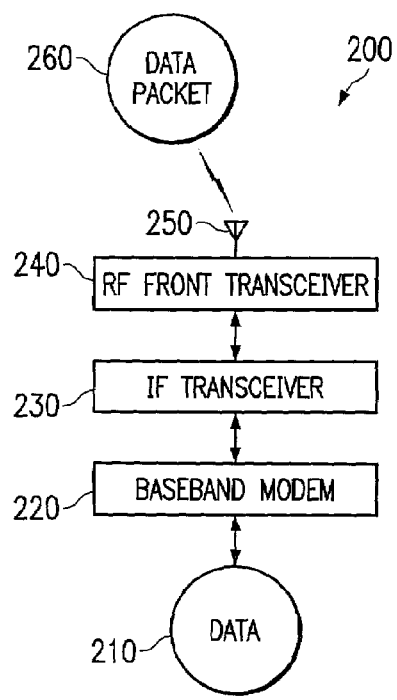
FIG. 2 illustrates the components of a conventional network base station.

FIG. 2 illustrates in simplified fashion the operation of a standard wireless network communications base station 200 in accordance with the prior art. Data for transmission 210 is processed through a baseband modem 220, an IF (intermediate frequency) transceiver 230, an RF front-end transceiver 240, and transmitted through antenna 250 as data packet 260. In the illustrated embodiment, antenna 250 comprises a single element, meaning an omni directional or wide fixed beam is used for each transmission. The process is reversed for the receipt of data at the base station from the subscriber.

Figure 3:
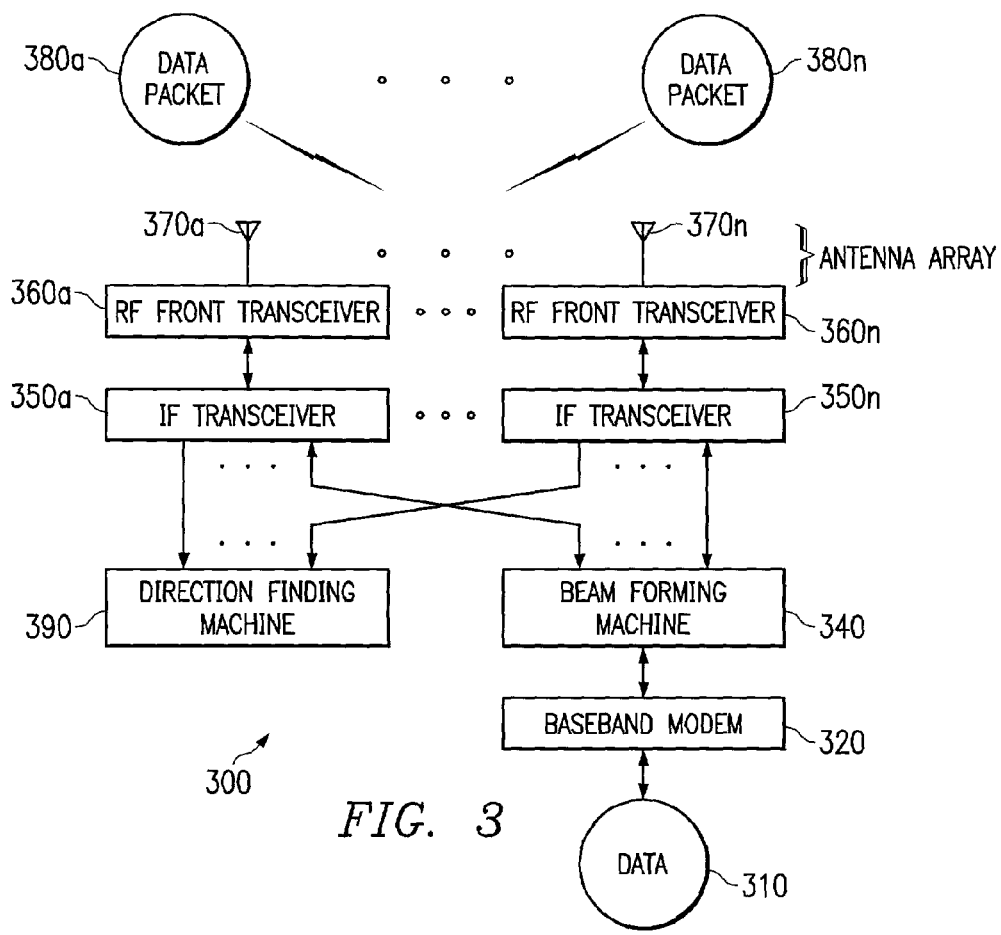
FIG. 3 illustrates the components of an adaptive array enhanced base station in accordance with one embodiment of the present invention.

FIG. 3 illustrates in simplified form the operation of a wireless network communications base station 300 in accordance with one embodiment of the present invention. Data element 310 is processed for transmission through a baseband modem 320 and then sent to a beam-forming machine 340. Note that while only a single data element 310 is illustrated, it may be comprised of multiple individual data packets for transmission to different users.

Preferably using one of the beam forming algorithms more fully disclosed herein, beam-forming machine 340 determines the proper weights (e.g. signal amplitude, signal phase, and/or in-phase and quadrature (IQ) relationships) for signals carrying data element 310 to IF transceiver elements 350a–350n in the transmitting array. Specifically, based upon the position of the particular subscriber unit (not illustrated) data element 310, or a portion thereof, is to be transmitted, beam-forming machine 340 provides proper weighting of signals passed there through to result in free-space combining of the signals for optimized communication with the desired subscriber unit. Accordingly, it should be appreciated that more than one transceiver is likely to be provided with a weighted signal carrying data element 310 in order that a relatively narrow directional antenna beam may be formed. Moreover, preferred embodiments of the present invention provide for simultaneous transmission of data to multiple subscriber units through simultaneously forming multiple beams. Accordingly, more than one transceiver is likely to be provided a signal for transmission in such an embodiment.

The output signals of IF transceivers 350a–350n of the illustrated embodiment are passed to its corresponding RF front-end transceivers 360a–360n and then to antenna elements 370a–370n. Antenna elements 370a–370n may be any form of radio frequency active element, such as a dipole, micro-strip patch, heliacal coil, or like antenna element well known in the art. Signals radiated from antenna elements 370a–370n preferably combine in free space to illuminate locations associated with subscriber units with a corresponding one of data packets 380a–380n.

It should be appreciated that antenna elements 370a–370n of the preferred embodiment comprise a phased array antenna and, therefore, are preferably disposed in a predetermined geometry. Although shown as individual antenna elements, it should be appreciated that one or more of antenna elements 370a–370n may actually include multiple antenna elements, such as a column of radiating elements. It should also be appreciated that any number of antenna elements (or antenna element columns) may be utilized according to the present invention, but between 6 and 21 are considered most optimal.

The base station receiving process (reverse link) is largely the reverse of the transmission process (forward link) described above. Data packets 380a and 380b from subscriber units are received by antenna elements, which may be antenna elements 370a–370n used in transmission or different antenna elements (not shown). The signals received by the antenna elements are preferably processed by corresponding RF front-end transceivers, such as RF front-end transceivers 360a–360n, IF transceivers, such as IF transceivers 350a–350n, a beam former, such as beam forming machine 340, and a signal processor, such as baseband modem 320. The beam-forming machine is used for reverse link beam forming. The received data is also preferably routed through subscriber unit direction finding circuitry, such as direction finding machine 390, which is used to determine the subscriber's location for the selection of the most appropriate antenna beam or signal weighting scheme for subsequent communication. A more complete description of transmitting and receiving antenna arrays and associated circuitry may be found in the above referenced patent application entitled "Transmitting Beam Forming in Smart Antenna Array Systems".

It should be appreciated that the circuitry of base station 300 may operate under the control of a control algorithm (not shown) such as may be operable on a processor based system. For example, a general purpose processor based system, such as may be based upon the INTEL PENTIUM processor platform, may provide control of direction finding, beam forming, and/or other aspects of the present invention. Accordingly, such control algorithms may be operable within beam forming machine 340, direction finding machine 390, and/or a separate controller (not shown).

Multiple techniques may be utilized according to the present invention to provide interference diversity gain. As previously mentioned hopping of one or more communication attributes, including space, time, and/or frequency, may be applied in communication sessions conducted according to the present invention. Moreover, hopping of communication attributes according to the present invention may be provided in various ways. For example, a preferred embodiment of the present invention utilizes a fast hopping technique. Another embodiment of the present invention utilizes a slow hopping technique.

Fast Hopping Embodiment

Figure 4:
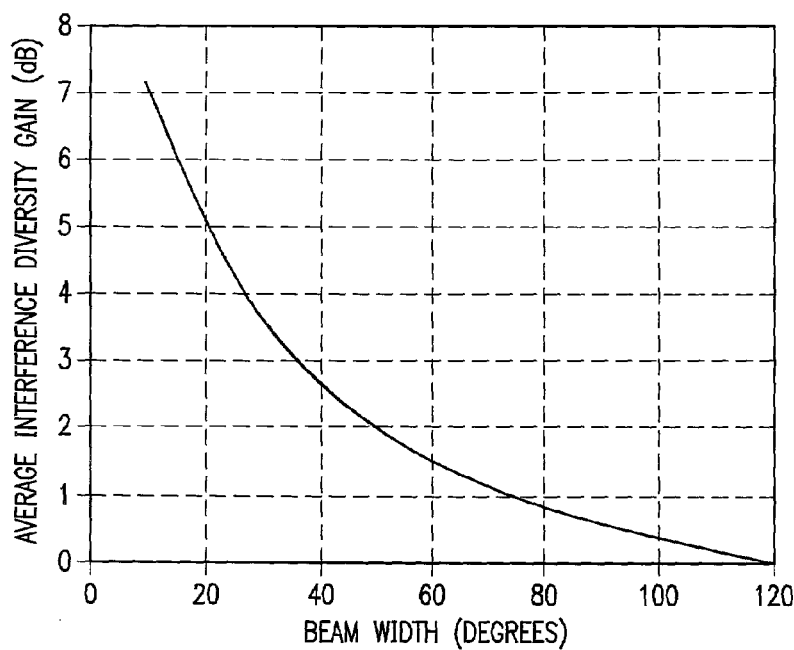
FIG. 4 is a graph showing interference diversity gain averaged over subscriber positions within a cell.

In one embodiment of the present invention, hopping of various communication attributes is provided at a rate faster than the interleaving frame rate (referred to herein as the fast hopping system or fast hopping algorithm). According to this embodiment, a channel estimation is preferably made for each subscriber. For example, the C/I (carrier to interference ratio) of each subscriber may be estimated as the sum (in dB) of the C/I of the pilot channel, the antenna array gain and the interference diversity gain. The direction of each subscriber unit is assumed to be known with reasonable accuracy, such as to within 5° as shown in the above referenced patent application entitled "Practical Space-Time Radio Method for CDMA Communication Capacity Enhancement". The interference diversity gain may be estimated as illustrated in FIG. 4 using an effective beam width greater than the minimum beam width since simultaneous hopping beams may be used.

Simultaneous hopping beams may be used as necessary according to the present invention to operate in a power efficient region, defined as a region of C/I in which the ratio of data rate to required C/I is above a threshold. In the HDR system, for example, the power efficient region (i.e., $C/I <= C/I_{sat}$, where $C/I_{sat} = 3.0$ dB for the HDR system) corresponds to quadrature phase shift keying (QPSK) modulation and adaptation of the processing gain. When $C/I > C/I_{sat}$, higher order constellations are used, resulting in a reduction of the ratio of data rate to required C/I.

Figure 5A:
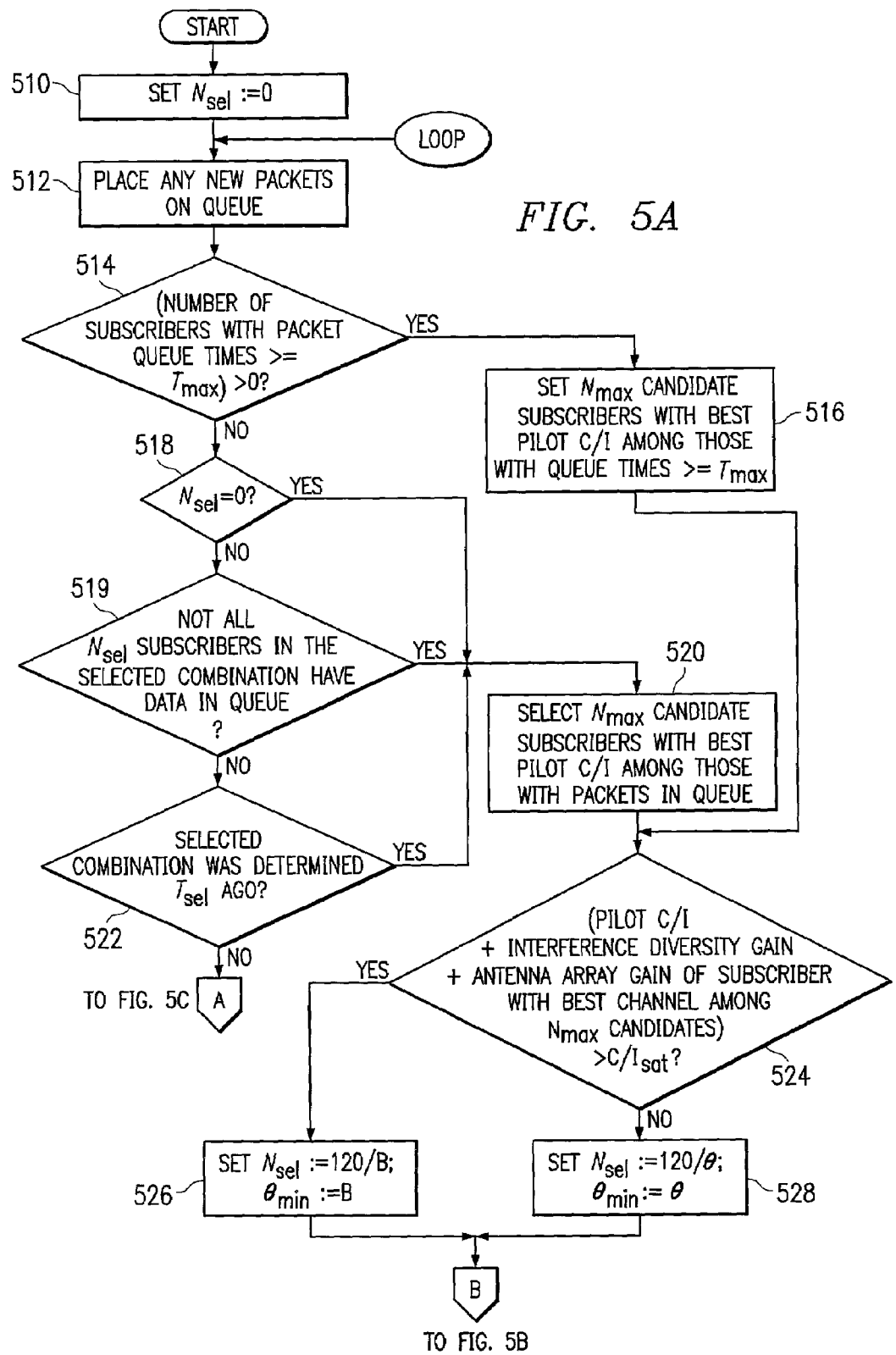
FIG. 5 is a flow chart of a fast hopping algorithm according to one embodiment of the present invention.
Figure 5B:
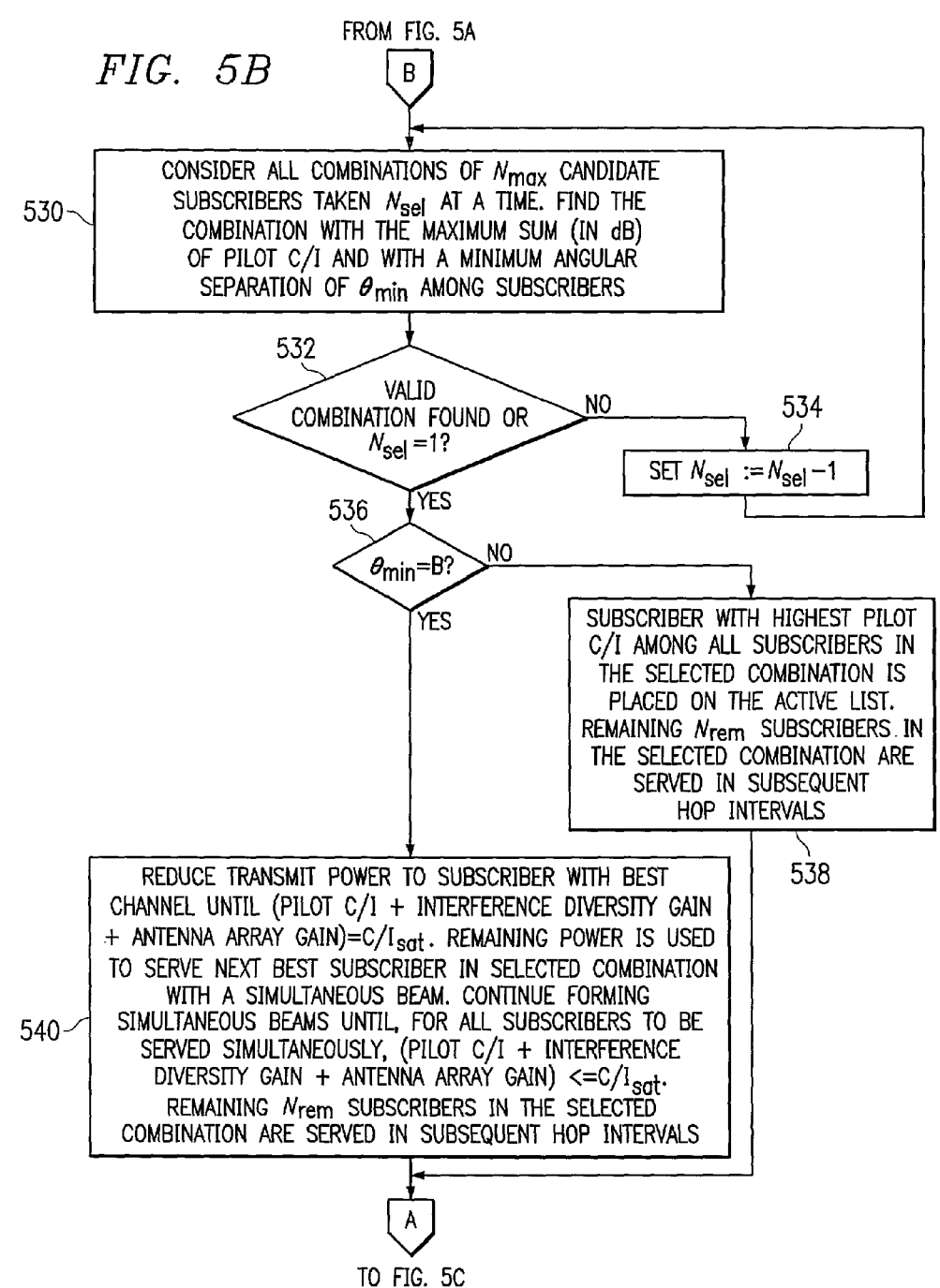

A flow chart of a preferred embodiment fast hopping algorithm, as applied to the HDR system with 120-degree sectors, is shown in FIGS. 5A and 5B. Those skilled in the art will appreciate that the described method can be readily adapted to other TDMA based systems as well. A detailed description of such an embodiment of the fast hopping algorithm is given below.

As shown in FIG. 5A, the fast hopping algorithm of the illustrated embodiment is initialized by setting a parameter $N_{sel}$ to zero in step 510. For each hop interval, any new packets (along with the corresponding time of packet arrivals, not shown) are placed on the queue for transmission in step 512. The queue times for all packets are then preferably computed (not shown) and the number of subscribers with packet queue time greater than or equal to an established threshold time $T_{max}$ determined in step 514.

If there are any subscribers with packet queue times greater than or equal to $T_{max}$ (step 514), a set of $N_{max}$ candidate subscribers with the best pilot C/I ratios is preferably selected among the subscribers with packet queue times greater than $T_{max}$ in step 516 and processing proceeds to step 524. $N_{max}$ is preferably determined by system design parameters. For example, according to a preferred embodiment $N_{max}$ is determined principally as a tradeoff between computational complexity if $N_{max}$ is too large, and a low probability of simultaneous beam formation if it is too small. As shown in Table 1, 8 is considered to be a typical number for $N_{max}$.

If all packet queue times are less than $T_{max}$, (step 514) and one of three conditions are satisfied, a set of $N_{max}$ candidate subscribers with the best pilot C/I ratio is preferably selected among the subscribers with packets in the queue in step 520 and processing proceeds to step 524. The three conditions are $N_{sel}=0$ (step 518), not all $N_{sel}$ subscribers in the selected combination have data in the queue (step 519), or the selected combination was determined $T_{sel}$ ago (step 522).

At step 524 the subscriber with the highest pilot C/I ratio among the $N_{max}$ candidate subscriber units is preferably identified. Thereafter, according to the illustrated embodiment of the present invention, the sum (in dB) of the pilot C/I, interference diversity gain and antenna array gain is calculated for this subscriber in step 524 and, if greater than $C/I_{sat}$, the parameters $N_{sel}$ (the subscriber units selected for simultaneous service in the current hop interval) and $\theta_{min}$ (the angular separation of the simultaneously active subscriber units) are set in step 526, otherwise $N_{sel}$ and $\theta_{min}$ are set in step 528. At step 526, $N_{sel}$ and $\theta_{min}$ are preferably set as follows: $N_{sel}=120/B$ (it being appreciated that 120 is the sector width of the HDR system of the illustrated embodiment), $\theta_{min}=B$, where B>0 (B representing the minimum beam width in degrees according to this embodiment). At step 528, $N_{sel}$ and $\theta_{min}$ are preferably set as follows: $N_{sel}=120/\theta$, $\theta_{min}=0$, step 528, where $0<\theta<B$ ($\theta$ representing the minimum angular separation of active subscribers).

It should be appreciated that values for B and $\theta$ may be selected with consideration of a number of parameters. For example, the minimum beam width B may be selected as the most narrow beam width which may be formed by the antenna array utilized or, more preferably, may be selected to be a minimum beam width for providing acceptable communications, such as may be affected by propagation conditions, scattering, frequencies utilized, and other network conditions. The value of $\theta$ may be selected by such considerations as a minimum angular spread of subscriber units providing a desired level of isolation for communication of signals associated therewith. For example, $\theta$ may be selected as a function of the minimum beamwidth B selected, such as approximately ½ B to ensure that the subscriber units are disposed a sufficient angle off of bore sight of an antenna beam used in communication with another such subscriber unit.

Once $N_{sel}$ and $\theta_{min}$ are determined, all combinations of the $N_{max}$ candidate subscribers taken $N_{sel}$ at a time are preferably considered in step 530 to determine valid combinations of subscribers which may be served in the current hop interval according to this embodiment of the invention. For example, combinations which correspond to a minimum angular separation among subscribers of less than $\theta_{min}$ are discarded as invalid combinations (not shown). At step 532 it is determined if any valid combinations of $N_{max}$ candidate subscribers are identified by the considerations in step 530. If no valid combination of $N_{max}$ candidate subscribers is identified, processing preferably proceeds to step 534 where $N_{max}$ is preferably decremented, and the search for valid combinations is repeated in step 530 with the new value of $N_{sel}$. The process of decrementing $N_{sel}$ by one and searching for a valid combination preferably continues until either $N_{sel}=1$ or a valid combination is found.

At step 532, if a valid combination of $N_{max}$ candidate subscribers is identified ($COMB_{sel}$) or $N_{max}=1$, processing preferably proceeds to step 536 (FIG. 5B) where the subscribers to be served in the current hop interval are decided. If $\theta_{min} \neq B$ (step 536) processing proceeds to step 538 for identification of the particular subscriber units to be served in the current hop interval. Alternatively, if $\theta_{min}=B$ (step 536) processing proceeds to step 540 for identification of the particular subscriber units to be served in the current hop interval.

At step 538 the subscriber with the highest pilot C/I among the subscribers in $COMB_{sel}$ is preferably chosen for service in the current hop interval, the number of subscribers to be served in the current hop interval, $N_{sub}$, is preferably set to one, and processing proceeds to step 542. The remaining subscribers in $COMB_{sel}$ ($N_{rem}=N_{sel}-1$) are preferably served in subsequent hop intervals according to this embodiment of the invention.

At step 540 the transmit power associated with the subscriber with the highest pilot C/I (among the subscribers in $COMB_{sel}$) is preferably reduced such that the sum (in dB) of the pilot C/I, antenna array gain and interference diversity gain is equal to $C/I_{sat}$. Remaining transmit power is preferably used according to this embodiment to form a simultaneous hopping beam for the subscriber with the best channel (highest pilot C/I) among the remaining $N_{sel}-1$ subscribers in $COMB_{sel}$. Additional simultaneous beams are preferably formed in a similar manner until, for all $N_{sub}$ subscribers to be served simultaneously, the sum (in dB) of the pilot C/I, antenna array gain and interference diversity gain is less than or equal to $C/I_{sat}$. The remaining $N_{rem}=N_{sel}-N_{sub}$ subscribers in $COMB_{sel}$ are preferably served in subsequent hop intervals.

At step 542 data rates for the subscriber units to be served in the current hop interval are preferably selected. For example, for each subscriber $k=1, 2, \ldots, N_{sub}$ to be served simultaneously in the current hop interval, the sum (in dB) of the pilot C/I, antenna array gain and interference diversity gain may be used to select an appropriate data rate from a table or matrix of required C/I ratios and corresponding data rates for the HDR system of the illustrated embodiment. It should be appreciated that Qualcomm provides such data rate information for use with its HDR systems. However, such data rate information may be determined theoretically (e.g. using simulations) or empirically through reference to such parameters as the modulation scheme, the coding scheme, the interleaver period, the target bit and/or frame error rate.

Steps 544–557 identify the subscriber units of the $N_{sub}$ subscriber units for which the identified data rate is greater than zero (or possibly some other threshold data rate value) and provides data transmission thereto using hopping techniques as described herein. Specifically, at step 544 it is determined if the subscriber unit under consideration (k) is $<=N_{sub}$ and, if so, processing proceeds to step 548. At step 548 it is determined if the data rate for the subscriber unit under consideration is greater than zero and, if so, processing proceeds to step 557 for adding the subscriber unit under consideration to an active list of subscriber units for transmission in the current hop interval and incrementing k to the next subscriber unit of $N_{sub}$. If, however, the data rate for the data rate for the subscriber unit under consideration is zero at step 548, processing proceeds to step 552 where it is determined if the data rate has been zero for this subscriber unit for a consecutive number of times greater than $N_{drop}$. If the data rate for this subscriber unit has been zero for $N_{drop}$ consecutive times, the subscriber unit is preferably dropped from the system and k is incremented to the next subscriber unit of $N_{sub}$ at step 554. If, however, the data rate for this subscriber unit has not been zero for $N_{drop}$ consecutive times, k is incremented to the next subscriber unit of $N_{sub}$ at step 556. When, at step 544, it is determined that the subscriber unit under consideration (k) is no longer $<=N_{sub}$, transmission to all subscriber units placed on the active list of subscribers for transmission in the current hop interval is provided using hopping techniques as described herein (step 546).

Preferably, in the next hop interval, a new set of $N_{max}$ candidate subscribers is selected as described above if any of the three following conditions is satisfied: (a) there are subscribers with packet queue times greater than or equal to $T_{max}$, step 514, or (b) the previous combination, $COMB_{sel}$, was selected less than a threshold time $T_{sel}$ ago, step 522, or (3) not all $N_{sel}$ subscribers of $COMB_{sel}$ have data present in the transmit queue, step 518. If none of conditions (a), (b), or (c) is satisfied, the combination, $COMB_{sel}$, of subscribers is used in the next hop interval in step 542.

Although not specifically shown in the embodiment illustrated in FIGS. 5A and 5B, the set of $N_{rem}$ subscribers not served in the current hop interval is preferably given higher priority for transmission in subsequent hop intervals than the set of $N_{sub}$ subscribers served in the current hop interval. Within the set of $N_{rem}$ subscribers, priority is preferably assigned in order of decreasing pilot C/I. Similarly, within the set of $N_{sub}$ subscribers, priority is preferably assigned in order of decreasing pilot C/I. The $N_{sel}$ subscribers of $COMB_{sel}$ are preferably served in order of decreasing priority in subsequent hop intervals until either condition (a) or (b) is satisfied. If the lowest priority subscriber is served before either condition (a) or (b) is satisfied, the sequence of transmissions preferably repeats starting with the highest priority subscriber.

Typical parameters for use according to the preferred embodiment fast hopping algorithm are given in Table 1:

TABLE 1

Typical System Parameters

| | |
|---|---|
| Path Loss Exponent (n) | 3 |
| Standard Deviation of Lognormal Shadowing (σ) | 8 dB |
| Minimum Beam Width (B) | 30° |
| Minimum Angular Separation (θ) | 20° |
| C/I Threshold for Forming Simultaneous Beams (C/I$_{sat}$) | 3.0 dB |
| Number of Candidate Subscribers (N$_{max}$) | 8 |
| Queue Time Threshold (T$_{max}$) | 0.5 sec |
| Maximum Time for a Given Selected Combination (T$_{sel}$) | 1 sec |
| Drop Threshold (N$_{drop}$) | 10 |

Slow Hopping Embodiment

Figure 6A:
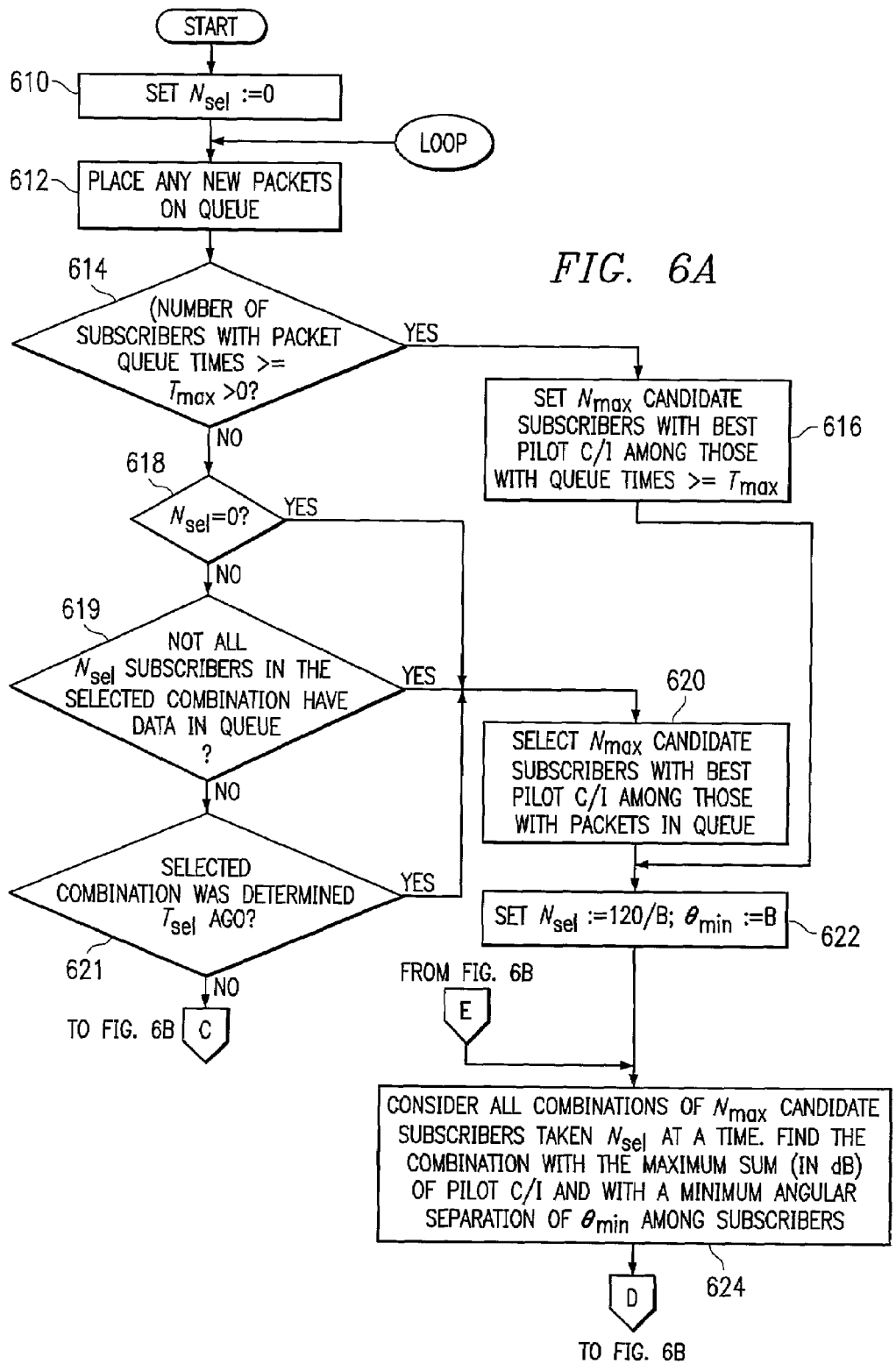
FIG. 6 is a flow chart of a slow hopping algorithm according to one embodiment of the present invention.

In a second embodiment of the present invention, hopping of various communication attributes is provided at a rate slower than the interleaving frame rate (referred to herein as the slow hopping system or slow hopping algorithm). According to a preferred embodiment slow hopping system, the number of simultaneous beams is chosen as large as possible to maximize the aggregate throughput during each hop interval. The criterion used to select the simultaneous beams is preferably maximization of the sum (in dB) of the pilot channel C/I ratios of the active subscribers in each time slot. As with the fast hopping system discussed above, the direction of each subscriber is assumed to be known to with reasonable accuracy, such as to within 5°. The minimum angular separation of the active subscribers ($\theta_{min}$) for this embodiment is preferably equal to the minimum beam width (B). Once the active subscribers are selected, the data rate for each subscriber is preferably selected using the C/I measured on the traffic channel. A flow chart of a preferred embodiment slow hopping algorithm of the present invention, as applied to an HDR system with 120-degree sectors, is shown in FIGS. 6A and 6B. Once again, those skilled in the art will appreciate that the slow hopping methods described below can be adapted to other TDMA based systems as well.

The slow hopping algorithm of the illustrated embodiment is preferably initialized by setting a parameter $N_{sel}$ to zero in step 610. At step 612, for each hop interval, any new packets (along with the corresponding time of packet arrivals) are preferably placed on the queue for transmission and the queue times for the packets computed. At step 614 a determination is made as to whether there are any subscribers with packet queue times greater than or equal to a threshold $T_{max}$. If there are subscribers with packet queue times greater than or equal to $T_{max}$ then processing preferably proceeds to step 616 wherein a set of $N_{max}$ candidate subscribers with the best pilot C/I ratio is selected among the subscribers with packet queue times greater than $T_{max}$. However, if all packet queue times are less than $T_{max}$ in step 614, and one of the following three conditions are satisfied, a set of $N_{max}$ candidate subscribers with the best pilot C/I ratios is preferably selected among the subscribers with packets in the queue in step 620. The three conditions are $N_{sel}=0$ (step 618), not all $N_{sel}$ subscribers in the selected combination have data in the queue (step 619), or the selected combination was determined $T_{sel}$ ago (step 621). The parameters $N_{sel}$ and $\theta_{min}$ are preferably set in step 622 as follows: $N_{sel}=120/B$, $\theta_{min}=B$, where B>0.

Once $N_{sel}$ and $\theta_{min}$ are determined, all combinations of the $N_{max}$ candidate subscribers taken $N_{sel}$ at a time are preferably considered in step 624 to determine valid combinations of subscribers which may be served in the current hop interval according to this embodiment of the invention. For example, combinations which correspond to a minimum angular separation among subscribers of less than $\theta_{min}$ may be discarded as invalid. At step 626 a determination is made as to whether valid combinations of subscribers have been identified. If no valid combinations of subscribers are identified, $N_{sel}$ is preferably decremented by one in step 628, and the search for valid combinations is repeated in step 624 with the new value of $N_{se}$. The process of decrementing $N_{sel}$ by one and searching for a valid combination preferably continues until either $N_{sel}=1$ or a valid combination is found in step 626.

At step 630, beams for each $N_{sel}$ subscriber unit in $COMB_{sel}$ are preferably formed for simultaneous service in the current hop interval. Preferably, each simultaneous beam is allocated equal transmit power.

At step 632 data rates for the subscriber units to be served in the current hop interval are preferably selected. For example, for each subscriber k=1, 2, . . . , $N_{sel}$ to be served simultaneously in the current hop interval, the C/I ratio measured on the traffic channel may be used to select the data rate from a table of required C/I ratios and corresponding data rates for the HDR system. It should be appreciated that the selection of data rates as described above uses instantaneous estimates of the C/I ratio measured on the traffic channel which may not always be available. Accordingly, a different channel measurement may be utilized to estimate the C/I ratio of the traffic channel. For example, an initial data rate for each subscriber can be chosen using the C/I ratio measured on the pilot channel and, thereafter, the data rate may be adapted as estimates of the C/I ratio measured on the traffic channel become available.

Steps 634–646 identify the subscriber units of the $N_{sel}$ subscriber units for which the identified data rate is greater than zero (or possibly some other threshold data rate value) and provides data transmission thereto using hopping techniques as described herein. Specifically, at step 634 it is determined if the subscriber unit under consideration (k) is $<=N_{sel}$ and, if so, processing proceeds to step 638. At step 638 it is determined if the data rate for the subscriber unit under consideration is greater than zero and, if so, processing proceeds to step 640 for adding the subscriber unit under consideration to an active list of subscriber units for transmission in the current hop interval and incrementing k to the next subscriber unit of $N_{sel}$. If, however, the data rate for the data rate for the subscriber unit under consideration is zero at step 638, processing proceeds to step 642 where it is determined if the data rate has been zero for this subscriber unit for a consecutive number of times greater than $N_{drop}$. If the data rate for this subscriber unit has been zero for $N_{drop}$ consecutive times, the subscriber unit is preferably dropped from the system and k is incremented to the next subscriber unit of $N_{sel}$ at step 644. If, however, the data rate for this subscriber unit has not been zero for $N_{drop}$ consecutive times, k is incremented to the next subscriber unit of $N_{sel}$ at step 646. When, at step 634, it is determined that the subscriber unit under consideration (k) is no longer $<=N_{sel}$, transmission to all subscriber units placed on the active list of subscribers for transmission in the current hop interval is provided using hopping techniques as described herein (step 636).

Preferably, in the next hop interval, a new set of $N_{max}$ candidate subscribers is selected as described above if any of the following conditions is satisfied: (a) there are subscribers with packet queue times greater than or equal to $T_{max}$ in step 614; (b) the previous combination, $COMB_{sel}$, was selected less than a threshold $T_{sel}$ ago in step 621, or; (c) not all $N_{sel}$ subscribers of $COMB_{sel}$ have data present in the transmit queue in step 618. If none of the conditions (a), (b), or (c) are satisfied, the combination, $COMB_{sel}$, of subscribers is preferably used in the next hop interval in step 630. The $N_{sel}$ subscribers of $COMB_{sel}$ are preferably served simultaneously in subsequent hop intervals until either condition (a) or (b) is satisfied. Typical parameters for the slow hopping algorithm are again given in Table 1.

The above algorithms may be used to determine which simultaneous beams can be utilized during a given transmission cycle, and the optimum beams to use based on subscriber location, signal strength, and the other parameters described above. When combined with frequency and/or time-slot hopping, significant increases in system capacity may be realized as shown below.

Simulation Results

The simulation described below confirms the efficacy of the fast and slow-hopping algorithms disclosed above.

Analysis of Throughput and Coverage Increases

Aggregate forward link throughput is evaluated for a HDR system with hexagonal geometry, reuse factor one, and typical system parameters as shown in Table 1. Stationary subscribers are placed uniformly within a 120° sector of a central cell. Interference from the six first tier cells is considered. The propagation model consists of path loss of the form $d^{-n}$ and lognormal shadowing with standard deviation σ dB. Packet requests are generated according to a Poisson process with the rate of requests proportional to the C/I of each subscriber. Packets with queuing time greater than a threshold $T_{max}$ receive top priority for transmission. A service attempt fails if the C/I of a subscriber selected for service is less than the minimum C/I required for transmission. A subscriber is dropped from the system if the number of consecutive failed service attempts exceeds a drop threshold $N_{drop}$. The coverage is defined as the percentage of subscribers that are not dropped from the system. The throughput and coverage are compared for a system with fast hopping, slow hopping and no beam forming.

Table 2 summarizes the throughput and coverage results for the three systems under consideration.

TABLE 2

| Simulation Results | | |
|---|---|---|
| | Throughput (kbps) | Coverage (%) |
| No Beam Forming | 330 | 82 |
| Fast Hopping | 1100 | 94 |
| Slow Hopping | 1300 | 94 |

The simulation results indicate that space-time hopping can provide more than three times the throughput and increase coverage when compared to a system without beam forming. It is envisioned that space-frequency and space-time-frequency hopping will similarly provide capacity improvement.

Analysis of Interference Diversity Gain

The gain due to interference diversity is analyzed for fast hopping for the cases of single and multiple interferers.

Interference Diversity Gain: Single Interferer

A serving base station and interfering base station with 120° sectors are considered. Stationary subscribers are served using fast hopping with beams of width B°. The probability that a subscriber is illuminated by an interfering beam is given by p=B/120. Therefore, the interference, I, seen by a subscriber can be modeled by the following distribution:

$Pr(I=0)=1-p; Pr(I=I_0/p)=p.$

The mean interference power is $E(I)=I_0$. The received signal power is represented by S, and thermal noise variance is $\sigma^2$. Two quantities of interest, the signal-to-interference-plus-noise ratio (SINR) and the interference-to-noise ratio (INR), are defined by $SINR=S/(I_0+\sigma^2)$ $INR=I_0/\sigma^2.$ The coded bit error rate (BER) performance of a system using fast hopping is compared to that of a system without beam forming. The mean interference power for both systems is $I_0$. Errors in adjacent bits are assumed to be independent after de-interleaving. A rate ¼ convolutional code (with generator matrix [765 671 513 473]) is applied to the de-interleaved bit stream. The coded BER for both systems with p=0.25 (B=30°) and INR=10 dB is plotted in FIG. 7.

Figure 7:
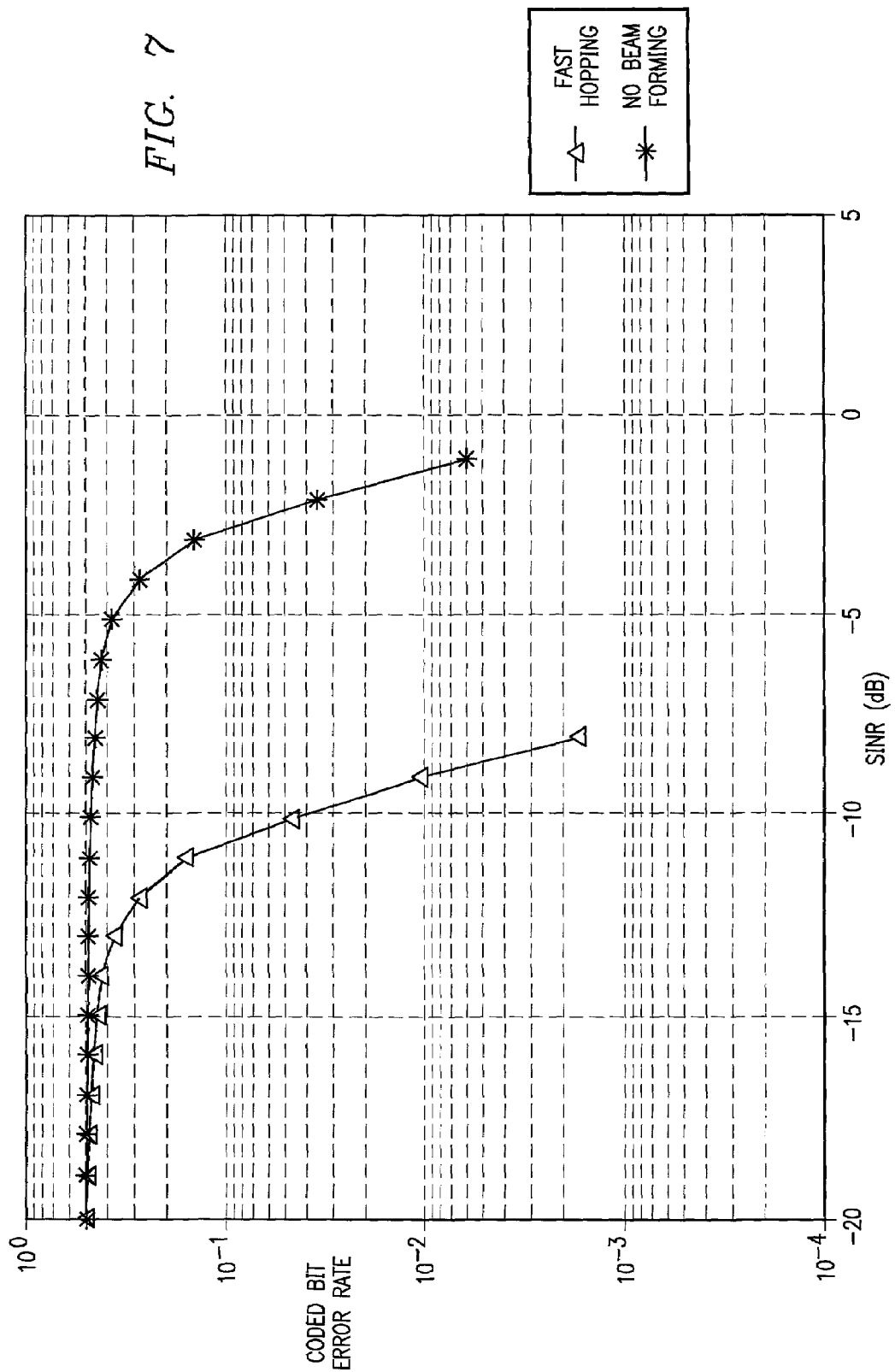
FIG. 7 is a graph showing the coded bit error rate performance of fast hopping and no beam forming for a single interferer.

From FIG. 7, the diversity gain of fast hopping with a single interferer is approximately 7.5 dB (at $10^{-2}$ coded BER).

Interference Diversity Gain: Multiple Interferers

The interference diversity gain for a cellular system with hexagonal geometry is evaluated. A reuse factor of one is used, and the interference from the six first tier cells is considered. A path loss of the form $d^{-n}$ is assumed, where d is the distance between a subscriber and a base station and n is the path loss exponent. A probability distribution of the mean interference power (averaged over lognormal shadowing) seen by a given subscriber is obtained from the path loss and the probability of illumination, p, by an interferer. For a given subscriber position, the interference diversity gain for fast hopping is computed as previously described. The interference diversity gain is then averaged over all subscriber positions within a cell. The average interference diversity gain is plotted in FIG. 4 for different beam widths B.

It should be appreciated that, although preferred embodiments have been described herein with reference to the forward link, the concepts of the present invention may be applied to reverse link communications as well. For example, one of ordinary skill in the art will appreciate that the hopping techniques and identification of multiple subscribers to provide simultaneous communications in a particular hop interval of the present invention may be used in the reverse link.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for providing communications with a plurality of subscriber units comprising:
   beam forming circuitry;
   direction finding circuitry; and
   control circuitry, wherein said control circuitry operates with said direction finding circuitry to determine a combination of subscriber units of said plurality of subscriber units for providing substantially isolated communication links, and wherein said control circuitry operates with said beam forming circuitry to implement an interference diversity gain scheme for use in conducting communications through said substantially isolated communication links.

2. The system of claim 1, wherein said control circuitry operates to determine a data rate for providing desired communication quality with subscriber units of said combination of subscriber units achievable when said interference diversity gain scheme is implemented.

3. The system of claim 1, wherein operation of said control circuitry with said direction finding circuitry determines angular separation of subscriber units of said plurality of subscriber units.

4. The system of claim 3, wherein said combination of subscriber units comprises a combination of subscriber units in which each subscriber unit of the combination has a minimum angular separation with respect to other subscriber units of the combination.

5. The system of claim 1, wherein operation of said control circuitry with said direction finding circuitry determines a pilot C/I of subscriber units of said plurality of subscriber units.

6. The system of claim 5, wherein said combination of subscriber units comprises a combination of subscriber units which as a combination have a greatest sum of pilot C/I as compared to other combinations of subscriber units of said plurality of subscriber units.

7. The system of claim 1, wherein said interference diversity gain scheme is implemented to alter a communication attribute at a rate higher than a base station interleaving frame rate.

8. The system of claim 7, wherein said rate is several times the base station interleaving frame rate.

9. The system of claim 1, wherein said interference diversity gain scheme is implemented to alter a communication attribute at a rate lower than a base station interleaving frame rate.

10. The system of claim 9, wherein said rate is on the order of tenths of the interleaving frame rate.

11. The system of claim 1, wherein said implementing an interference diversity gain scheme comprises a communication attribute hopping scheme to periodically alter an attribute of said communication links.

12. The system of claim 11, wherein the communication attribute hopping scheme comprises a pseudo random hopping scheme.

13. The system of claim 11, wherein the communication attribute hopping scheme comprises a deterministic hopping scheme.

14. The system of claim 11, wherein a communication attribute altered by the communication attribute hopping scheme comprises a time slot.

15. The system of claim 11, wherein a communication attribute altered by the communication attribute hopping scheme comprises a carrier frequency.

16. The system of claim 11, wherein a communication attribute altered by the communication attribute hopping scheme comprises an antenna beam spatial characteristic.

17. The system of claim 11, wherein the communication attribute hopping scheme alters a plurality of communication attributes.

18. The system of claim 17, wherein said plurality of communication attributes comprises a time slot and a carrier frequency.

19. The system of claim 1, wherein said beam forming circuitry comprises adaptive beam forming circuitry.

20. The system of claim 1, wherein said beam forming circuitry comprises fixed beam forming circuitry.

21. A method for providing communication comprising:
implementing an interference diversity gain scheme for conducting communications between a plurality of subscriber units and a base station;
determining a combination of subscriber units of said plurality of subscriber units for providing simultaneous substantially isolated communication links between subscriber units of said combination of subscriber units and said base station;
determining a data rate for providing desired communication quality with subscriber units of said combination of subscriber units achievable when said interference diversity gain scheme is implemented; and
providing said simultaneous substantially isolated communication links between subscriber units of said combination of subscriber units and said base station and providing therein data communication at an associated one of said determined data rates.

22. The method of claim 21, wherein said determining a combination of subscriber units comprises:
determining a combination of subscriber units in which each subscriber unit of the combination has a minimum angular separation with respect to other subscriber units of the combination.

23. The method of claim 21, wherein said determining a combination of subscriber units comprises:
determining a combination of subscriber units which as a combination have a greatest sum of pilot C/I as compared to other combinations of subscriber units of said plurality of subscriber units.

24. The method of claim 21, wherein said interference diversity gain scheme is implemented to alter a communication attribute at a rate higher than a base station interleaving frame rate.

25. The method of claim 24, wherein said rate is several times the base station interleaving frame rate.

26. The method of claim 21, wherein said interference diversity gain scheme is implemented to alter a communication attribute at a rate lower than a base station interleaving frame rate.

27. The method of claim 26, wherein said rate is on the order of tenths of the interleaving frame rate.

28. The method of claim 21, wherein said implementing an interference diversity gain scheme comprises:
establishing a communication attribute hopping scheme to periodically alter an attribute of said communication links.

29. The method of claim 28, wherein the communication attribute hopping scheme comprises a pseudo random hopping scheme.

30. The method of claim 28, wherein the communication attribute hopping scheme comprises a deterministic hopping scheme.

31. The method of claim 28, wherein a communication attribute altered by the communication attribute hopping scheme comprises a time slot.

32. The method of claim 28, wherein a communication attribute altered by the communication attribute hopping scheme comprises a carrier frequency.

33. The method of claim 28, wherein a communication attribute altered by the communication attribute hopping scheme comprises an antenna beam spatial characteristic.

34. The method of claim 28, wherein the communication attribute hopping scheme alters a plurality of communication attributes.

35. The method of claim 34, wherein said plurality of communication attributes comprises a time slot and a carrier frequency.

36. The method of claim 21, wherein said communication links are provided using a multiple beam antenna array.

37. The method of claim 36, wherein said multiple beam antenna array is coupled to adaptive beam forming circuitry.

38. The method of claim 36, wherein said multiple beam antenna array is coupled to fixed beam forming circuitry.

39. A method for providing increased wireless communication capacity comprising:
establishing a communication attribute hopping scheme to alter, over time, an attribute of a communication link associated with each active subscriber unit of a plurality of subscriber units in communication with a base station;
determining a combination of subscriber units of said plurality of subscriber units in which each subscriber unit of the combination has a minimum angular separation with respect to other subscriber units of the combination for providing substantially isolated communication links between subscriber units of said combination of subscriber units and said base station;
determining a data rate achievable when said communication attribute hopping scheme is implemented for providing desired communication quality with subscriber units of said combination of subscriber units;
providing said substantially isolated communication links between subscriber units of said combination of subscriber units and said base station and providing therein data communication at an associated one of said determined data rates; and
applying said communication attribute hopping scheme to said substantially isolated communication links.

40. The method of claim 39, wherein the communication attribute hopping scheme comprises a pseudo random hopping scheme.

41. The method of claim 39, wherein the communication attribute hopping scheme comprises a deterministic hopping scheme.

42. The method of claim 39, wherein a communication attribute altered by the communication attribute hopping scheme comprises a time slot.

43. The method of claim 39, wherein a communication attribute altered by the communication attribute hopping scheme comprises a carrier frequency.

44. The method of claim 39, wherein a communication attribute altered by the communication attribute hopping scheme comprises an antenna beam spatial characteristic.

45. The method of claim 39, wherein the communication attribute hopping scheme alters a plurality of communication attributes.

46. The method of claim 45, wherein said plurality of communication attributes comprises a time slot and a carrier frequency.

47. The method of claim 39, wherein said determining a combination of subscriber units comprises:
determining all combinations of subscriber units having at least a threshold angular separation and selecting a best combination of subscriber units therefrom.

48. The method of claim 47, wherein said determining a combination of subscriber units further comprises:

selecting said best combination of subscriber units at least in part as a combination having a greatest sum of pilot C/I.

49. The method of claim 39, wherein said communication links are provided using a multiple beam antenna array.

50. The method of claim 49, wherein said multiple beam antenna array is coupled to adaptive beam forming circuitry.

51. The method of claim 49, wherein said multiple beam antenna array is coupled to fixed beam forming circuitry.

52. The method of claim 39, wherein said substantially isolated communication links between subscriber units of said combination of subscriber units and said base station are provided simultaneously.

53. A method for mobile data communication comprising;
transmitting from a base station to mobile stations in a time division access scheme using multiple beams; and
switching, over time, a forward link time slot assignment of said time division access scheme of each of a plurality of subscriber units, said switching a forward link time slot assignment comprising transmitting to said plurality of subscriber units each within a different time slot of said time division access scheme and varying from transmission frame to transmission frame in a pseudo random sequence the time slot within which transmission is made to said subscribers.

54. The method of claim 53, further comprising varying the carrier frequency from transmission frame to transmission frame.

55. The method of claim 53, wherein the forward link time slot assignment is switched at a rate several times an interleaving frame rate.

56. The method of claim 55, wherein a forward link data rate for each subscriber unit is determined from a pilot signal-to-interference ratio, an antenna array gain, and an interference diversity gain estimated from statistics of an interference environment.

57. The method of claim 55 wherein one or more simultaneous forward link beams are formed to maximize throughput for a fixed transmit power.

58. The method of claim 53, wherein the forward link time slot assignment is switched at a rate less than an interleaving frame rate.

59. The method of claim 58, wherein a forward link data rate is determined for each subscriber unit by monitoring signal quality of a traffic signal-to-interference ratio.

60. The method of claim 58, wherein a number of simultaneous forward link beams is maximized at each switching interval to maximize throughput for a fixed transmit power.

* * * * *

UNITED STATES PATENT AND TRADEMARK OFFICE
CERTIFICATE OF CORRECTION

PATENT NO. : 7,016,649 B1  Page 1 of 1
APPLICATION NO. : 09/803718
DATED : March 21, 2006
INVENTOR(S) : Ravi Narasimhan et al.

It is certified that error appears in the above-identified patent and that said Letters Patent is hereby corrected as shown below:

On the Title Page, Item (60) in the Related U.S. Application Data, delete the portion of text reading "Provisional application No. 60/190,009, filed on Mar. 17, 2000." and replace with --Provisional application No. 60/234,722, filed on Sept. 22, 2000, and provisional application No. 60/190,009, filed on Mar. 17, 2000, to which the benefit of priority is claimed.--.

Signed and Sealed this

Fifth Day of August, 2008

JON W. DUDAS
*Director of the United States Patent and Trademark Office*